United States Patent
Lee et al.

(10) Patent No.: US 10,977,527 B2
(45) Date of Patent: Apr. 13, 2021

(54) METHOD AND APPARATUS FOR DETECTING DOOR IMAGE BY USING MACHINE LEARNING ALGORITHM

(71) Applicant: ARCHIDRAW. INC., Seoul (KR)

(72) Inventors: Jusung Lee, Seoul (KR); Jongseon Hong, Seoul (KR)

(73) Assignee: ARCHIDRAW. INC., Seoul (KR)

( * ) Notice: Subject to any disclaimer, the term of this patent is extended or adjusted under 35 U.S.C. 154(b) by 386 days.

(21) Appl. No.: 16/087,403

(22) PCT Filed: Mar. 14, 2017

(86) PCT No.: PCT/KR2017/002706
§ 371 (c)(1),
(2) Date: Sep. 21, 2018

(87) PCT Pub. No.: WO2017/164554
PCT Pub. Date: Sep. 28, 2017

(65) Prior Publication Data
US 2021/0004652 A1     Jan. 7, 2021

(30) Foreign Application Priority Data
Mar. 22, 2016 (KR) .......................... 10-2016-0034155

(51) Int. Cl.
*G06K 9/00* (2006.01)
*G06K 9/66* (2006.01)
(Continued)

(52) U.S. Cl.
CPC ............. *G06K 9/66* (2013.01); *G06K 9/4642* (2013.01); *G06N 20/00* (2019.01); *G06T 3/40* (2013.01); *G06T 3/60* (2013.01)

(58) Field of Classification Search
CPC .... G06K 9/66; G06K 9/4642; G06K 9/00771; G06K 2209/01; G06K 9/00369;
(Continued)

(56) References Cited

U.S. PATENT DOCUMENTS 9,978,149 B1 * 5/2018 Zhang ...................... G06T 7/13
2007/0106900 A1 * 5/2007 Kalker ................. G06T 1/0064
713/176

(Continued)

FOREIGN PATENT DOCUMENTS

JP          03194406 A * 8/1991
KR   10-2005-0074837 A     7/2005
(Continued)

*Primary Examiner* — Mahendra R Patel
(74) *Attorney, Agent, or Firm* — Novick, Kim & Lee, PLLC; Sang Ho Lee

(57) ABSTRACT

Provided are a method and an apparatus for detecting door image using machine learning algorithm that can easily detect a door image from a design drawing. The method for detecting a door image using a machine learning algorithm includes extracting a plurality of element images from the drawing; filtering the extracted element images using at least one of the size of the image and the number of right angle components; obtaining histogram information projected on the basis of a specific axis with respect to each of the filtered element images; and detecting at least one door image of the filtered element images by using the obtained histogram information as a feature information.

17 Claims, 6 Drawing Sheets

(51) Int. Cl.
*G06K 9/46* (2006.01)
*G06N 20/00* (2019.01)
*G06T 3/40* (2006.01)
*G06T 3/60* (2006.01)

(58) Field of Classification Search
CPC ........ G06K 9/3258; G06N 20/00; G06T 3/60; G06T 3/40; H04N 7/181
USPC .......................................................... 382/103
See application file for complete search history.

(56) References Cited

U.S. PATENT DOCUMENTS

| | | | | |
|---|---|---|---|---|
| 2008/0031490 | A1* | 2/2008 | Kobayashi | G06K 9/3258 382/101 |
| 2008/0089579 | A1* | 4/2008 | Han | G06K 9/6256 382/159 |
| 2011/0096149 | A1* | 4/2011 | Au | G08B 13/19608 348/47 |
| 2012/0256854 | A1* | 10/2012 | Lee | G06F 3/017 345/173 |
| 2012/0330447 | A1* | 12/2012 | Gerlach | G01B 21/20 700/95 |
| 2013/0038694 | A1* | 2/2013 | Nichani | G06K 9/2036 348/46 |
| 2013/0094759 | A1* | 4/2013 | Yagi | G06T 7/269 382/170 |
| 2013/0296885 | A1* | 11/2013 | Desai | A61B 17/3421 606/130 |
| 2016/0148363 | A1* | 5/2016 | Phan | G06K 9/00664 348/142 |
| 2016/0189454 | A1* | 6/2016 | Johnson | H04W 12/0608 340/5.61 |
| 2017/0186291 | A1* | 6/2017 | Wenus | G01S 3/786 |

FOREIGN PATENT DOCUMENTS

| | | |
|---|---|---|
| KR | 10-2006-0022371 A | 3/2006 |
| KR | 10-2014-0031742 A | 3/2014 |
| KR | 10-2015-0022158 A | 3/2015 |
| KR | 20150022158 A * | 3/2015 |
| KR | 10-2015-0099964 A | 9/2015 |
| WO | WO-2017164554 A1 * | 9/2017 ............. G06N 99/00 |

* cited by examiner

METHOD AND APPARATUS FOR DETECTING DOOR IMAGE BY USING MACHINE LEARNING ALGORITHM

TECHNICAL FIELD

The present invention is a method and an apparatus for detecting door image using machine learning algorithm which can detect the door image included in the drawing using a machine learning algorithm.

This application claims priority to Korean Patent Application No. 10-2016-0034155 filed in the Korean Intellectual Property Office on Mar. 22, 2016, the entire contents of which are incorporated herein by reference.

BACKGROUND ART

Generally, a CAD program is installed in a personal computer or a notebook computer to design a drawing, the drawing is designed using a drawing device such as a mouse or a tablet to obtain the designed drawings.

A user can open the designed drawings with DWG or DXF form by other computer using CAD program, and the user can design drawings by editing work such as correction work.

In addition, if the designed drawing is converted into an image file (for example, JPG file, GIF file, PNG file, etc.) or PDF file, the user can view the image file using other view program. But it is impossible that the user can not reuse the image file.

On the other hand, the conventional technology, for converting a file such as an image file back to a CAD drawing, is enable to for interwork with CAD as an electric pen combined with a mouse or for automatically create, store or write a CAD file on the web or in anytime and anywhere without being limited by time. The user may control CAD by using an optical sensor or a pen-shaped optical mouse simultaneously and can create an image and a drawing file with DWG or DXF form and can save into a storing device (for example, memory) of the an electric pen in the conventional technology. And the user can make a file of TEXT type by handwriting input only, and it can also be saved as a text (character) format of CAD.

However, the above conventional technique has a disadvantage that it is impossible to reuse the image file because the image file can not be converted back to the design drawing, and there is the inconvenience that the user must directly sketch or manually read the design drawing with a digital electronic pen mouse in the conventional technique for automatically generating CAD drawings using the digital electronic pen mouse.

In addition, as making the design drawing, the user may receive the drawing image file and detect specific elements such as a door, a window, or a washstand from the drawing image to check the element coordinate information, or use the detected specific element for a service work such as an interior work.

DISCLOSURE

Technical Problem

The present invention has been made to solve the above problems, it is an object of the present invention to provide a method and an apparatus for detecting door image using machine learning algorithm that can accurately and easily detect a door image from a design drawing.

Technical Solution

In one aspect, a method for detecting a door image using a machine learning algorithm, which extracts the door image from a drawing including a plurality of element images, the method comprising: extracting a plurality of element images from the drawing; filtering the extracted element images using at least one of the size of the image and the number of right angle components; obtaining histogram information projected on the basis of a specific axis with respect to each of the filtered element images; and detecting at least one door image of the filtered element images by using the obtained histogram information as a feature information.

In other aspect, a method for detecting a door image using a machine learning algorithm, which extracts the door image from a drawing including a plurality of element images, the method comprising: extracting a plurality of element images from a drawing; filtering the extracted element images using at least one of the size of the image and the number of the right angle components; obtaining histogram information projected on the basis of a specific axis with respect to each of the filtered element images; constructing a data set distinguished into a door image and other images by using a projection histogram obtained as a feature information; and performing the machine learning for detecting the door image using the data set configured.

Meanwhile, the door image detecting method may be implemented as a computer program for performing die door image detecting method and stored in a recording medium, also the door image detecting method may be performed by a terminal device according to an embodiment of the present invention.

In another aspect, a door image detecting apparatus, which extracts a door image from a drawing including a plurality of element images, the apparatus comprising: an element extracting unit for extracting a plurality of element images from the drawing; a filtering unit for filtering the extracted element images using at least one of the size of the image and the number of the right angle components; a feature obtaining unit for obtaining histogram information projected on the basis of a specific axis with respect to each of the filtered element images; and a detecting unit for detecting at least one door image of the filtered element images by using the obtained histogram information as a feature information.

Advantageous Effects

According to an embodiment of the present invention, it is provided to a method and an apparatus for detecting door image using machine learning algorithm that can accurately and easily detect a door image from a design drawing by detecting the door after filtering a plurality of element images extracted from the drawing using the image size or the number of right angle components and performing machine learning by the feature of the histogram information projected based on a specific axis. Therefore, the door image can be more accurately and easily detected from the general drawing image file.

DESCRIPTION OF DRAWINGS

The accompanying drawings, which are included to provide a further understanding of the invention and are incor

BEST MODE

Figure 1:
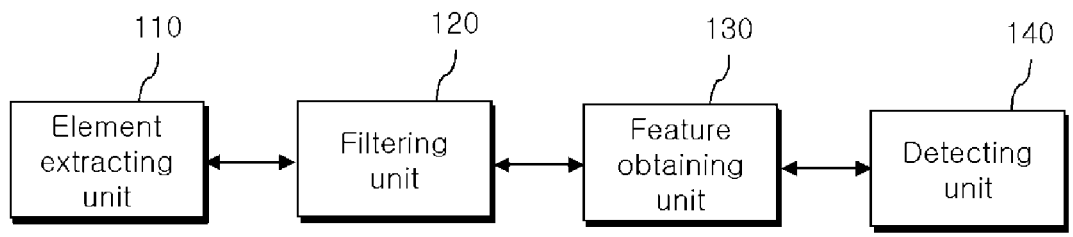
- FIG. 1 is a block diagram showing a configuration of a door image detecting apparatus according to an embodiment of the present invention.

Content of below illustrates only a principle of the present invention. Therefore, those skilled in the art will invention to a variety of devices that are included in the scope of this concept, although clearly described or implementing the principles of the present invention, have not been shown herein invention. Further, all the conditional terms and embodiments listed herein, for example, are as a general rule, and only to that understanding the concept of the present invention clearly intended, be understood that not limited to this manner specifically enumerated embodiments and conditions do.

In addition, not only the principles, viewpoints and embodiments of the invention all the description listing the particular embodiments are to be understood to be intended to include structural and functional equivalents of such locations. In addition, it is to be understood as including equivalents such waters all devices invented to make, as well as equivalents now known or that is independent of the equivalent structures will be developed in the future to perform the same function.

Thus, for example, block diagrams of the present specification are to be understood as representing a conceptual viewpoint of an exemplary circuit that embodies the principles of the invention. Similarly, all the flowcharts, state conversion degree, the pseudo-code, etc. are understood to represent a variety of processes regardless of whether the computer can substantially represent the readable medium there is clearly shown a computer or processor, and executed by a computer or processor, it should be.

Functions of the various elements shown in the figures, including functional blocks labeled as a processor or a similar concept can be provided through the use of dedicated hardware as well as hardware that has the capability of executing software in association with appropriate software. When provided by a processor, the functions may be provided by a single dedicated processor, single shared processor, or a plurality of individual processors, some of which may be shared.

The processor, control, or the explicit use of the term to be presented in a similar concept is to be construed by the hardware has the capability of executing software exclusive recited is not being, ROM for storing a digital signal processor (DSP) hardware, software, without limitation, (ROM), it is to be understood as comprising a random access memory (RAM) and nonvolatile memory implicitly. It can not contain other hardware in tolerance.

In the claims of this specification, the component expressed as a means for performing a function described in the detailed description include, for example, any type of software, including performing the function circuit combinations or firmware/microcode in the element such as was intended to include all methods for performing a function, it is combined with appropriate circuitry for executing the software for performing the functions. The present invention as defined by such claims are functions provided by the various listed means are coupled are bonded to the way that the claims require any means that can provide the function also equivalent to those identified from the specification it should be understood that.

The aforementioned objects, features and advantages will become more apparent from the following description in conjunction with the accompanying drawings, a self-technical features of the present invention one of ordinary skill in the art thus can be easily There will be. Further, the detailed description of the known art related to the invention In the following description of the present invention will be omitted and a detailed description on the case that are determined to unnecessarily obscure the subject matter of the present invention.

Hereinafter, a preferred embodiment of the present invention will be described in detail with reference to the accompanying drawings.

FIG. 1 is a block diagram illustrating a configuration of a door image detecting apparatus according to an embodiment of the present invention, the door image detecting apparatus 100 may include an element extracting unit 110, a filtering unit 120, a feature obtaining unit 130, and a detecting unit 140.

The door image detecting apparatus 100 is for extracting an image of a specific element such as a door, a window, or a washstand included in the input drawing image. The door image detecting apparatus may be a terminal device such as a desktop computer, a mobile phone, a smart phone, or a laptop computer. However, the present invention is not limited thereto, and may be various devices capable of processing images and the like.

On the other hand, the drawing image input to the door image detecting apparatus 100 may be an image taken picture a hand-drawn drawing by a user, or an image file in the form of JPG, GIF, PNG, or PDF.

Referring to FIG. 1, first the element extracting unit 110 extracts a plurality of element images from the drawing to detect the door image from the drawing having a plurality of element images.

The element extracting unit 110 may include a binarization unit for binarizing the drawing image and an image extracting unit for extracting a plurality of element images that are distinguished from each other in the image of the binarized drawings.

The filtering unit 120 filters the extracted element images using at least one of the size of the image and the number of the right angle components.

The filtering unit 120 may include a first filtering unit for excluding element images having an image size larger than a reference value among the element images, and a second filtering unit for excluding element images having an inner right angle component of 2 or more among the element images.

On the other hand, the feature obtaining unit 130 obtains histogram information projected on the basis of an axis with respect to each of the filtered element images, and the detecting unit 140 detects at least one door image of the filtered element images by using the obtained histogram information as feature information.

In addition, the door image detecting apparatus 100 may further include an image converting unit for rotating the filtered element images and then converting the filtered element images into images of a specific size.

According to an embodiment of the present invention, it is possible to more accurately and easily detect the door image from the general drawing image file by filtering a plurality of element images extracted from the drawing using the image size or the number of right angle components and then performing the machine learning using the histogram information projected based on a specific axis as a feature to use the door detection.

Hereinafter, an embodiment of a door image detecting method using the machine learning algorithm will be described in more detail with reference to FIG. 2 to FIG. 7.

Figure 2:
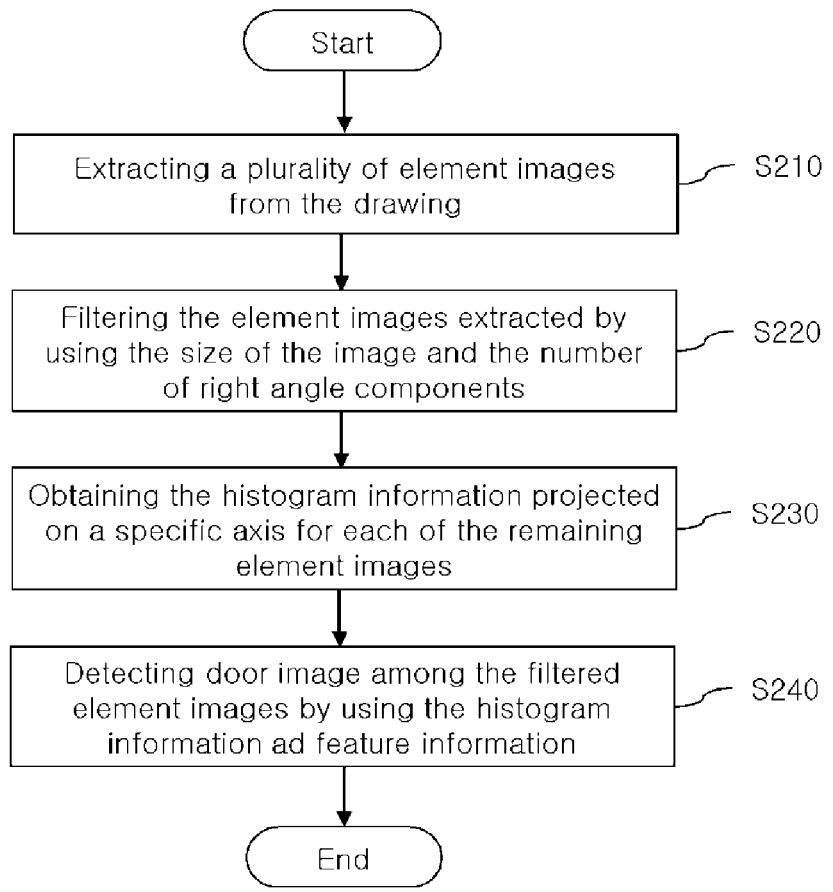
FIG. 2 is a flowchart illustrating a method of detecting a door image based on a machine learning algorithm according to an embodiment of the present invention.

FIG. 2 is a flowchart illustrating the method of detecting the door image based on the machine learning algorithm according to an embodiment of the present invention.

Referring to FIG. 2, the terminal device according to an embodiment of the present invention extracts a plurality of element images from the drawing (S210).

In step S210, the terminal device may pre-process the input drawing image for the door detection and extract a plurality of element images included therein.

For example, the terminal device may binarize the drawing image to detect approximate outline information and extract a plurality of element images which are distinguished from each other by the outline in the binarized drawing images.

Figure 3:
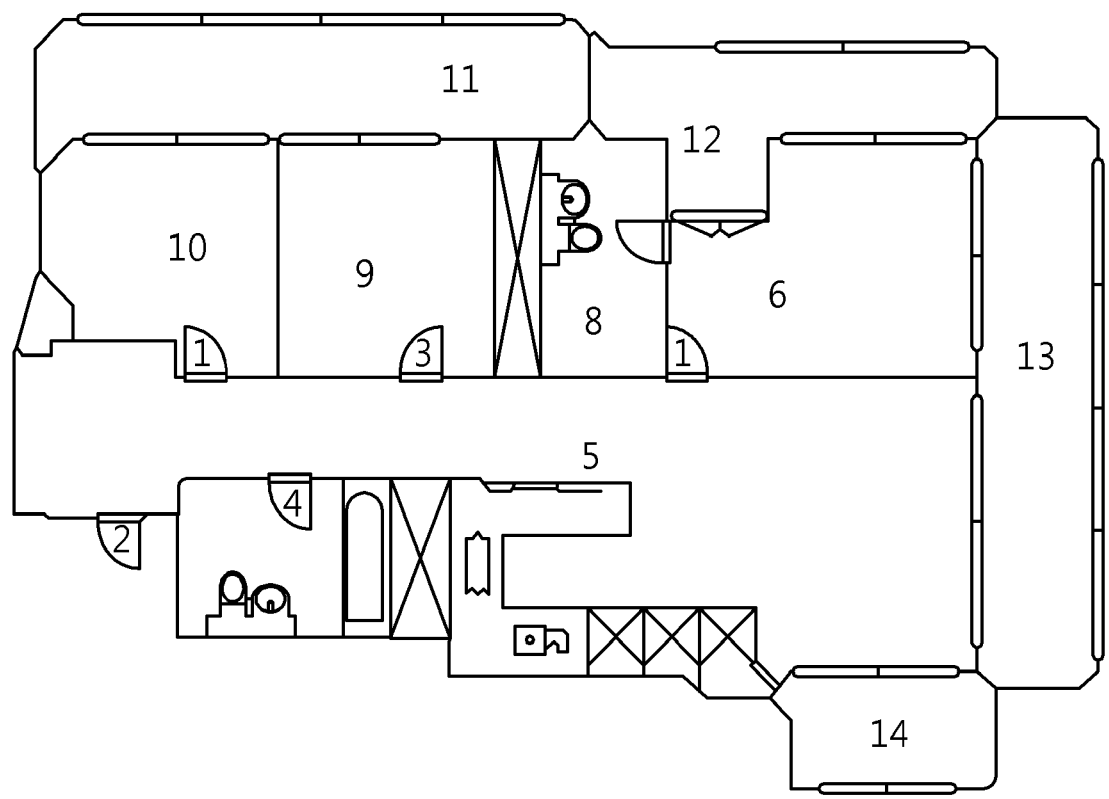
FIG. 3 is a view for explaining an embodiment of a pre-processing process of the drawing image according to an embodiment of the present invention.

FIG. 3 is a view for explaining an example of a pre-processed drawing image, and shows that a plurality of element images are labeled, where the element images include a door distinguished into white in the drawing image in which approximate outline information is detected through the binarization.

However, the labeling result for the drawing image shown in FIG. 3 is for explaining the pre-processing process, and the result may be different from the image output as the actual pre-processing result.

Thereafter, the terminal device filters the element images extracted from the drawing using the size of the image and the number of right angle components (S220).

For example, the terminal device may remove element images having the image size larger than the reference value from the door image candidate group among the plurality of element images extracted in step S210.

As the door image included in the drawing has a width or a height of a certain range of values, a wide space element such as a room or a terrace may be excluded from the door image candidate group as shown in FIG. 3, by removing the element images having the size larger than a predetermined reference value.

Also, the terminal device can remove the element images having an internal right angle component of 2 or more from the door image candidate group among the plurality of element images.

Figure 4:
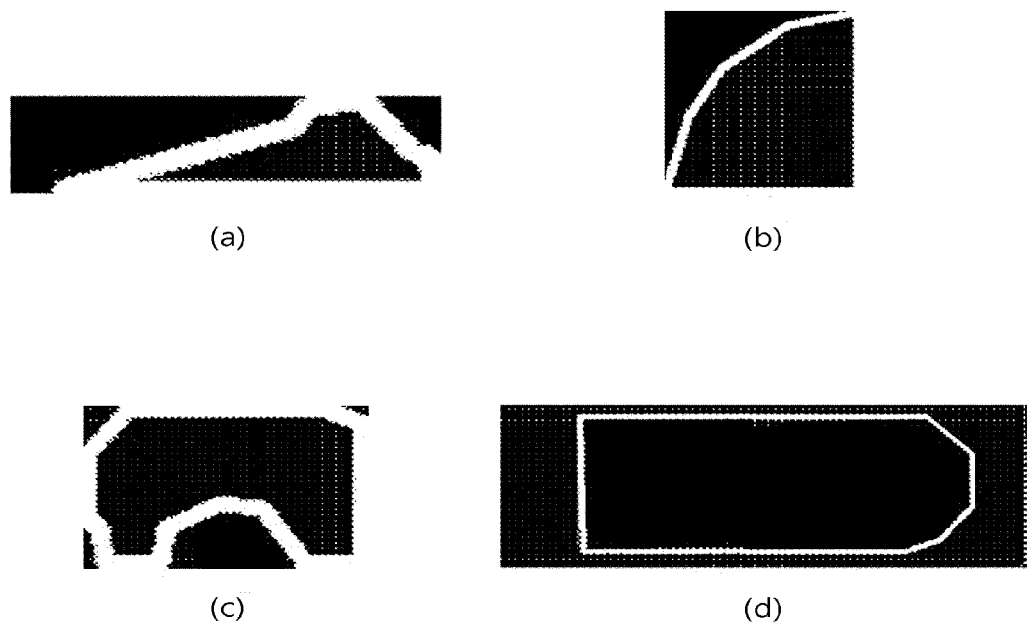
FIG. 4 is a view showing an example of element images detected from a drawing.

FIG. 4 shows an example of element images detected from the drawing, in which FIG. 4 (*a*) is an image corresponding to a bathroom door, FIG. 4(*b*) is an image corresponding to a door, FIG. 4(*c*) is an image corresponding to a washstand, FIG. 4(*d*) is an image corresponding to the bathtub.

The images shown in FIG. 4 is drawn the outline of the element image extracted in step S210 on a black plane, and the number of orthogonal components of an inner space of the element image in the process may be detected.

In the case of the door image shown in FIG. 4(*b*), only one right angle component is included in the inner space, while in the case of the bathroom door image shown in FIG. 4(*a*), the right angle component may not be included.

On the other hand, in the case of the washstand image and the bathtub image shown in FIGS. 4(*c*) and 4(*d*), two or more right angle components may exist in the inner space.

Accordingly, the terminal device may exclude the washstand images and the bathtub images shown in FIGS. 4(*c*) and 4(*d*) from the door image candidate group by removing the element images whose internal right angle components are two or more from the door image candidate group.

Then, the terminal device may obtain the histogram information projected on a specific axis for each of the remaining element images filtered in step S220 (S230).

As described above, the door image detecting method according to an embodiment of the present invention may use the machine learning algorithm using the feature information as the histogram information projected on the specific axis with respect to an element image.

For this purpose, the terminal device (or an element detecting program stored therein) is mechanically learned in advance by using the projection histogram information as the feature information, and the method of performing the machine learning using the projection histogram information as the feature information will be described in more detail below with reference to FIGS. 8 and 9.

In step S230, the terminal device may rotate each filtered element image and convert into the image of a specific size before generating the projection histogram for the element image.

For example, the terminal device may detect the longest axis in the element image and calculate the angle with the x axis, and then rotate the element image in the opposite direction of the angle.

Figure 5:
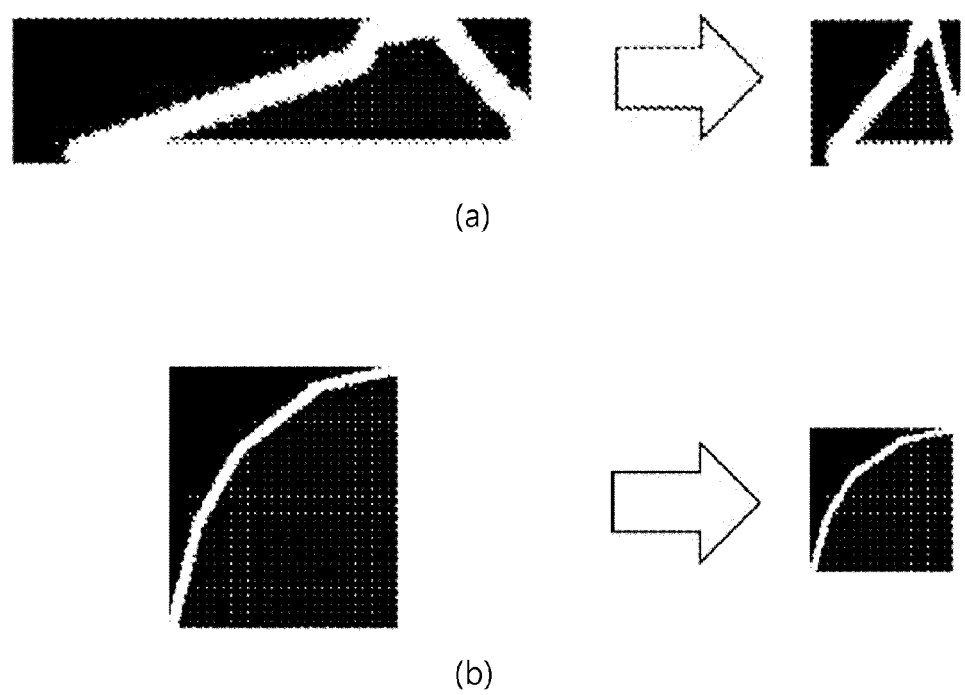
FIG. 5 is a view for explaining an embodiment of a method of converting filtered element images.

Also, as shown in FIG. 5, the terminal device may resize each of the filtered element images into a predetermined size of '64×64'

Thereafter, the terminal device may project the element image with reference to the x-axis or y-axis, and generate the histogram as the feature information on the element image.

The terminal detects the at least one door image among the filtered element images by using the histogram information as feature information obtained in step S230 (S240).

Figure 6:
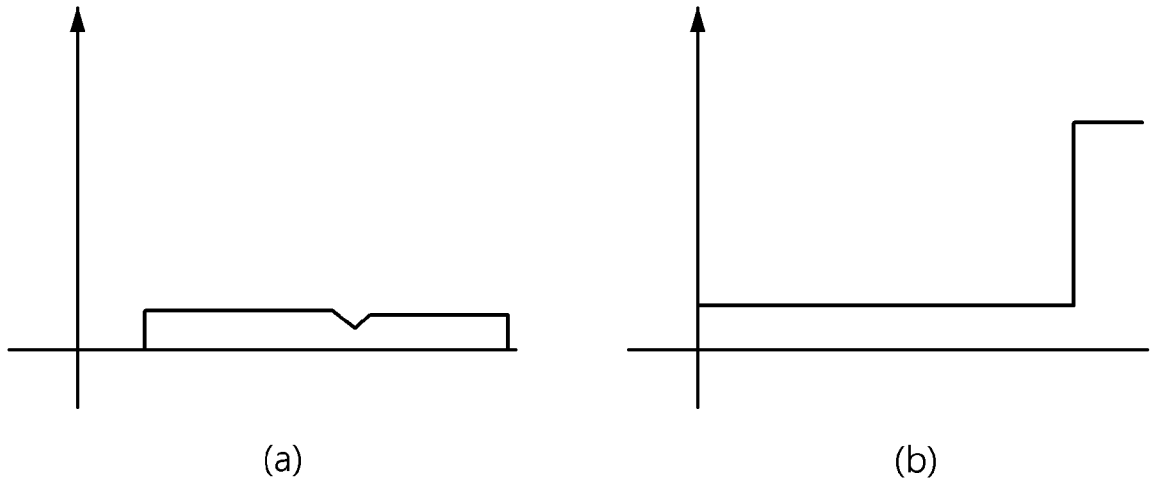
FIGS. 6 and 7 are views showing examples of histogram information obtained by projecting the element images.

FIG. 6(*a*) shows a histogram of the resized bathroom door image shown in FIG. 5(*a*) projected on the basis of the x-axis, and FIG. 6(*b*) shows a histogram of the resized door image shown in FIG. 5(*b*) projected on the x-axis.

Figure 7:
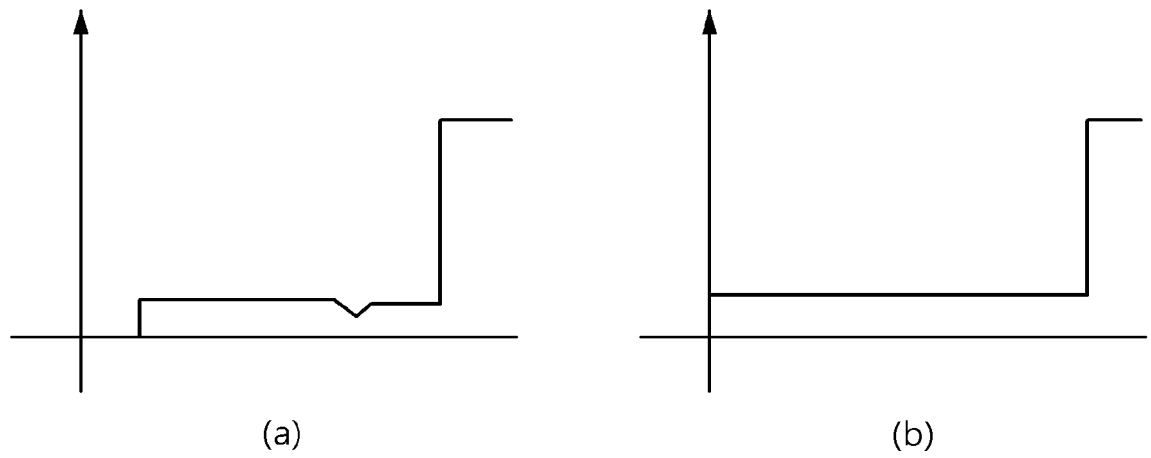

FIG. 7(*a*) shows a histogram of the resized bathroom door image shown in FIG. 5(*a*) projected on the y-axis, and FIG. 7(*b*) shows a histogram of the resized door image shown in FIG. 5(*b*) projected on the y-axis As shown in FIGS. 6 and 7, since the door image and other element images (for example, bathroom door image) show differences in the projection histograms based on the x-axis or the y-axis, it is possible to correctly classify whether the corresponding image is the door image or not, when inputting the projection histograms as the feature to a machine learning system.

Hereinafter, an embodiment of the method for performing machine learning for detecting the door image will be described in detail with reference to FIGS. 8 and 9.

Figure 8:
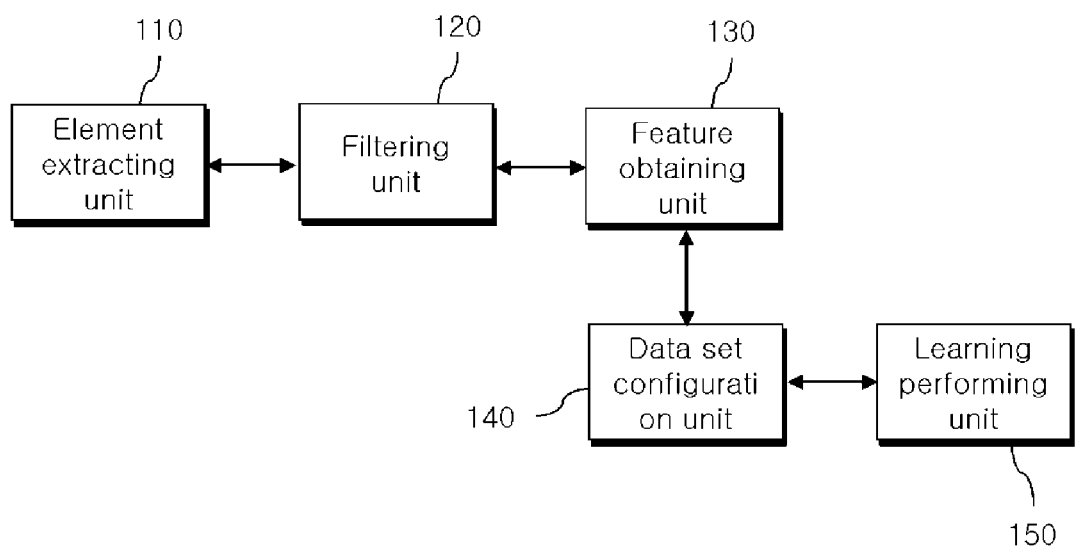
FIG. 8 is a block diagram showing a configuration of a door image detecting apparatus according to another embodiment of the present invention.
Figure 9:
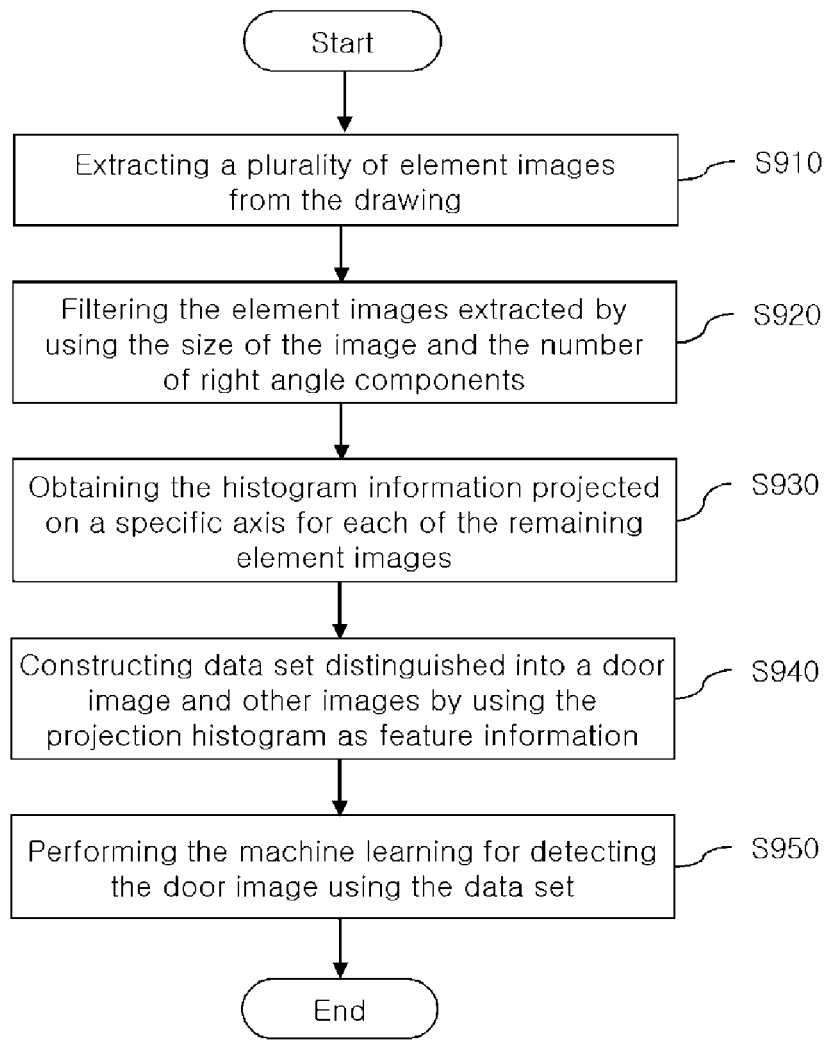
FIG. 9 is a flowchart illustrating a method of detecting a door image based on a machine learning algorithm according to another embodiment of the present invention.

FIG. 8 is a block diagram showing a configuration of the door image detecting apparatus according to another embodiment of the present invention, and FIG. 9 is a flowchart illustrating a method of detecting the door image based on the machine learning algorithm according to another embodiment of the present invention. In the meantime, descriptions of the same methods as those described with reference to FIGS. 1 to 7 will be omitted from among the methods of performing the machine learning described below.

Referring to FIGS. 8 and 9, the element extracting unit 110 of the door image detecting apparatus 100 extracts a plurality of element images included therein from the drawing image (step S910), and the filtering unit 120 extracts the element image filtered using the size of the image and the number of right angle components (step S920).

The feature acquiring unit 130 obtained histogram information projected on a specific axis with respect to each of the filtered element images as feature information for a machine learning (step S930).

Thereafter, the data set configuration unit 140 constructs data set distinguished into a door image and other images by using the projection histogram obtained through the feature acquisition unit 130 as feature information (step S940).

The learning performing unit 150 performs the machine learning for detecting the door image using the data set configured through the data set construction unit 140 (S950).

In steps S940 and S950, the method of constructing the data set for the machine learning using the projection histogram of the element image as the feature information and performing the machine learning using the data set may use machine learning algorithm based on Support Vector Machine (SVM), the machine learning algorithms is not limited thereto in the present invention, various machine learning algorithms such as decision tree learning method, association rule learning method, artificial neural network, genetic programming method, inductive logic programming method, clustering, Bayesian network, reinforcement learning method, expressive learning method and equality metric learning method may be used.

The door image detecting method according to the present invention may be stored in a computer-readable recording medium manufactured as a program to be executed in a computer, examples of the computer-readable recording medium include ROM, RAM, CD-ROM, a magnetic tape, a floppy disc, optical data storage devices, and it is implemented in the form of carrier waves (such as data transmission through the Internet).

Further, the computer-readable recording medium is distributed over network coupled computer systems so that the computer readable code is stored and executed in a distributed fashion. Then, the functional (functional) programs, codes, and code segments for accomplishing the present invention can be easily construed by programmers skilled in the art to which the invention pertains.

In addition, more than the been shown and described a preferred embodiment of the invention, the invention is not limited to the embodiment of the above-described particular, technology pertaining the art without departing from the subject matter of the present invention claimed in the claims field in the embodiment and various modifications are possible as well as by those of ordinary skill, this modified embodiment would should not be understood individually from the technical spirit or prospect of the present invention.

What is claimed is:

1. A method for detecting a door image using a machine learning algorithm, which extracts the door image from a drawing including a plurality of element images, the method comprising:
    extracting the plurality of element images from the drawing;
    filtering the extracted plurality of element images using at least one of a size and a number of right angle components of each of the plurality of element images;
    obtaining histogram information projected on a basis of a specific axis with respect to the each of the filtered plurality of element images;
    detecting at least one door image of the filtered plurality of element images by using the obtained histogram information as feature information;
    constructing a data set distinguishing door images and other images by using the histogram information obtained as the feature information; and
    performing machine learning by using the obtained histogram information.

2. The method for detecting door image using machine learning algorithm according to claim 1, wherein the extracting the plurality of element images comprises:
    binarizing an image of the drawing; and
    extracting the plurality of element images distinguished from each other in the binarized image of the drawing.

3. The method for detecting door image using machine learning algorithm according to claim 1, wherein the filtering the extracted plurality of element images comprises excluding element images having an image size larger than a reference value among the plurality of element images extracted.

4. The method for detecting door image using machine learning algorithm according to claim 1, wherein the filtering the extracted plurality of element images comprises excluding element images having two or more internal right angle components among the plurality of element images.

5. The method for detecting door image using machine learning algorithm according to claim 1, further comprising rotating the filtered plurality of element images.

6. The method for detecting door image using machine learning algorithm according to claim 1, further comprising converting the filtered plurality of element images into images of a specific size.

7. A method for detecting a door image using a machine learning algorithm, which extracts the door image from a drawing including a plurality of element images, the method comprising:
    extracting the plurality of element images from the drawing;
    filtering the extracted plurality of element images using at least one of a size and a number of right angle components of each of the plurality of element images;
    obtaining histogram information projected on a basis of a specific axis with respect to the each of the filtered plurality of element images;
    constructing a data set distinguishing door images and other images by using the obtained histogram information as feature information; and
    performing machine learning for detecting the door image using the data set.

8. A computer program stored on a non-transitory medium for carrying out the method of claim 1.

9. A non-transitory recording medium on which a program recorded thereon for executing the method according to claim 1.

10. A terminal device performing the method of claim 1.

11. A door image detecting apparatus, which extracts a door image from a drawing including a plurality of element images, the apparatus comprising:
   an element extracting unit for extracting the plurality of element images from the drawing;
   a filtering unit for filtering the extracted plurality of element images using at least one of a size and a number of right angle components of each of the plurality of element images;
   a feature obtaining unit for obtaining histogram information projected on a basis of a specific axis with respect to the each of the filtered plurality of element images;
   a detecting unit for detecting at least one door image of the filtered plurality of element images by using the obtained histogram information as feature information,
   a data set configuration unit for constructing a data set distinguishing door images and other images by using the histogram information; and
   a learning performing unit for performing machine learning for detecting the door image using the data set.

12. The door image detecting apparatus according to claim 11, wherein the element extracting unit comprises:
   a binarization unit for binarizing an image of the drawing; and
   an image extracting unit for extracting the plurality of element images distinguished from each other in the binarized image of the drawing.

13. The door image detecting apparatus according to claim 11, wherein the filtering unit comprises:
   a first filtering unit for excluding element images having an image size larger than a reference value among the plurality of element images; and
   a second filtering unit for excluding element images having two or more internal right angle components among the plurality of element images.

14. The door image detecting apparatus according to claim 11, further comprising an image converting unit for rotating and converting the filtered plurality of element images into images of a specific size.

15. A computer program stored on a non-transitory medium for carrying out the method of claim 7.

16. A non-transitory recording medium on which a program recorded thereon for executing the method according to claim 7.

17. A terminal device performing the method of claim 7.

* * * * *